May 3, 1949.　　　I. BENNETT ET AL　　　2,468,953
PLURAL TARGET EYE-TESTING DEVICE
Filed June 3, 1947　　　2 Sheets-Sheet 1

INVENTORS
Irving Bennett
Jacob Venger
BY George C. Waddell

Attorney

May 3, 1949.   I. BENNETT ET AL   2,468,953
PLURAL TARGET EYE-TESTING DEVICE
Filed June 3, 1947   2 Sheets-Sheet 2
Fig. 3.
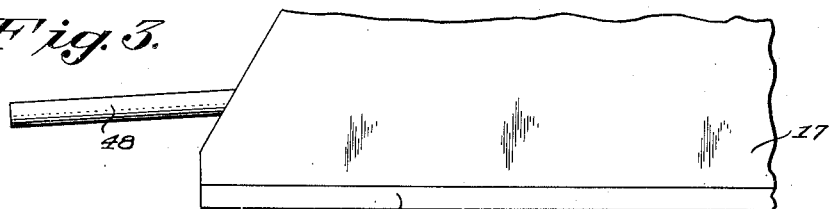
Fig. 4.
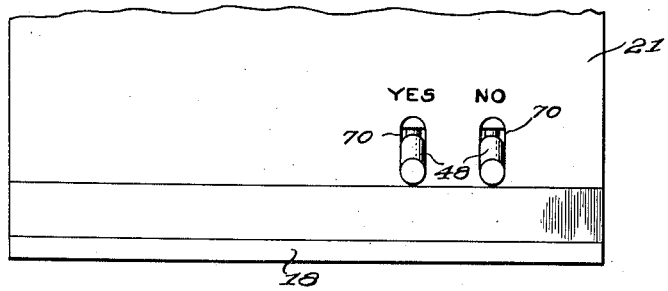
Fig. 5.
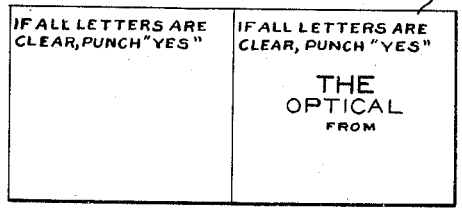
Fig. 5-A.
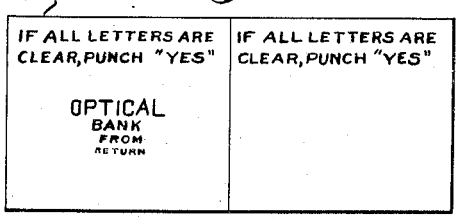
Fig. 5-B.
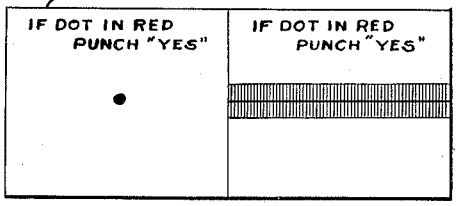
Fig. 6.
| YES | | NO |
|---|---|---|
| YES | | NO |
| YES ○ | VISION RIGHT EYE | NO |
| YES | VISION LEFT EYE | NO ○ |
| YES ○ | EYES LEVEL | NO |
INVENTORS
Irving Bennett
Jacob Venger
BY George C. Waddell
James Atkins
Attorney

UNITED STATES PATENT OFFICE 2,468,953

PLURAL TARGET EYE-TESTING DEVICE

Irving Bennett, Jacob Venger, and George C. Waddell, Beaver Falls, Pa.

Application June 3, 1947, Serial No. 752,196

8 Claims. (Cl. 88—20)

This invention relates to a method of and apparatus for testing eyes.

It is the purpose of this invention to provide apparatus for visual classification tests as are now employed to determine the work performance ability of students, factory and other workers, members of the armed forces and other groups of persons through their visual ratings, under standardized conditions.

While different apparatus for this purpose have heretofore been proposed, they were such as to require the services of an operator to conduct the tests, thereby rendering such tests expensive, at least to the extent of the salary of the operator.

A primary object of this invention is the provision of apparatus for testing eyes under standardized conditions which is capable of being carried out by the person undergoing the test to the exclusion of an operator heretofore required.

A further object of the invention is the provision of eye testing apparatus including a plurality of target cards successively viewable through a stereoscope, together with means for recording the test results relative to each target card viewed.

A still further object of the invention is the provision of eye testing apparatus including a plurality of targets supported on a rotatable drum and being successively viewable through a stereoscope and a roll of tape rotatably supported and intermittently advanceable in synchronism with the advancement of the targets upon rotation of the drum, together with punches operable to punch the tape between advance movements thereof for recording the results of the test with respect to each target viewed.

Other objects and advantages of the invention will become obvious in the course of the following detailed description, taken in connection with the accompanying drawings, wherein:

Figure 3 is a fragmentary side elevational view showing the normal disposition of the operating handles.

Figure 4 is a front elevational view of the portion of the apparatus shown in Figure 3.

Figures 1, 2:
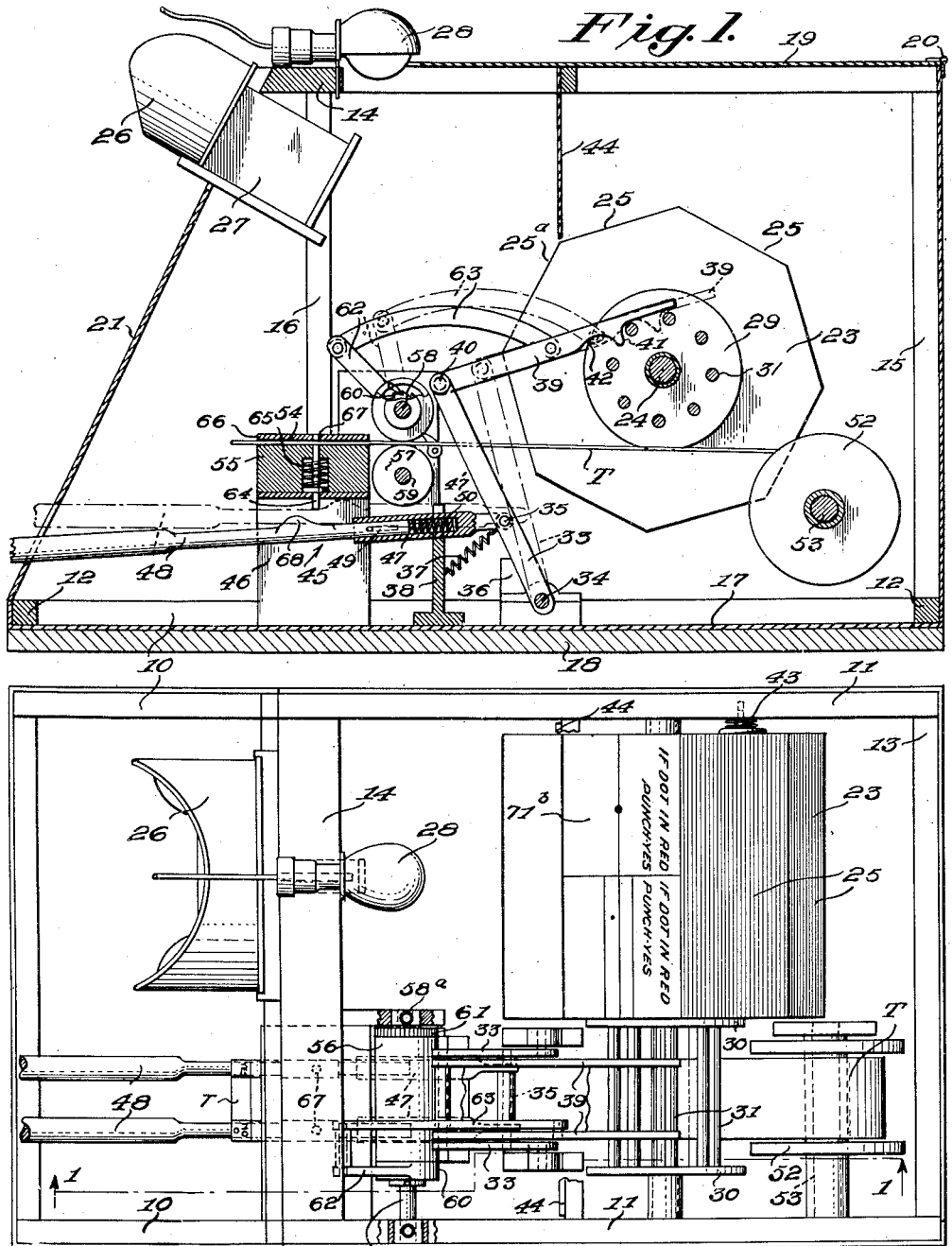
Figure 1 is a longitudinal vertical sectional view as observed substantially in the planes of the broken line I—I on Figure 2.
Figure 2 is a top plan view of the apparatus with certain cover plates removed and parts broken away and in section.

Figures 5, 5A, and 5B are plan views of three of the target cards employed with the apparatus.

Figure 6 is a plan view of a portion of a record strip or tape employed with the apparatus.

Before proceeding with the detailed description of the apparatus, it is to be understood that a frame structure and bearings and supports for the various cooperating elements is illustrated as a satisfactory form, and that the casing, bearings and supports may be substantially varied as may best suit manufacturing conditions, it being essential only that the cooperating elements supported by the frame be relatively disposed substantially as disclosed.

While the frame may be of unitary metallic construction, it is illustrated in a satisfactory form as embodying lower side rails 10, upper side rails 11, lower end rails 12, and upper end rails 13 and 14, together with rear vertical rails 15, and one or more front vertical rails 16.

The frame structure thus described may be covered with light gauge sheet metal in fixed relation to the rails on the bottom, sides and rear end of the frame, as indicated at 17, and a suitable supporting base 18 may be provided for the frame.

The top of the frame is preferably closed by a sheet metal lid 19 pivoted at 20, and the front of the frame is preferably closed by a removable sheet metal panel 21 which slopes forwardly from the forward ends of the shorter top side rails 11 to the forward ends of the longer bottom horizontal rails 10.

A drum 23 is rotatably supported within the casing on a suitably journalled shaft 24, and the drum is provided with a plurality, preferably eight, plane rectangular faces 25 for removably supporting target cards, later referred to.

A stereoscope 26 is suitably supported by the rail 14 in advance of an opening in the front cover plate 21. The stereoscope is of well known construction, embodying a pair of lenses, and is provided with a plate 27 disposed between the lenses, for a purpose later to appear.

The drum 23 is shown in Figure 1 in a normal position for viewing a target on the face 25$^a$, and such face is disposed normal to the lines of sight through the stereoscope 26. While the stereoscope may be disposed horizontally for viewing targets in vertical position, the inclination as shown is desired as being best suited to a comfortable position of the head of one undergoing a test.

The stereoscope lens and drum faces are spaced a distance suited to any standardized conditions of test as relates to distance. The standardized conditions of a test also include a measured illumination of the targets, and accordingly a lamp 28 is suitably supported by the casing as, e. g., the rail 14, and projects through the lid 19 for directing its rays into proximity to the drum 23.

A ratchet member 29 is suitably secured to the drum 23 co-axially thereof, and while such ratchet member may be of various constructions it is shown in a satisfactory form as embodying opposed end discs 30 supporting the opposed ends of rungs 31 which correspond in number to the faces 25 on the drum 23.

The drum 23 is adapted for successive increments of rotation for bringing the faces 25 successively into the position of face 25ª by manually operable means. The manually operable means in a preferred embodiment thereof comprise a pair of upright bars 33 disposed in laterally spaced parallel relation and pivotally connected at their lower ends to the frame, as at 34. The bars 33 are interconnected intermediate their ends by a pivot rod 35, and the bars are normally held against a suitable stop 36 by means of a spring 37, one end of which may be connected to the rod 35 and the opposite end thereof connected to a vertical support 38.

A pair of pawl bars 39 are pivotally connected at 40 to the upper ends of bars 33, and the pawl bars 39 are provided with projections 41 for engaging successive rungs 31 and recessed portions 42 for clearing the next following rungs.

The bars 33 are adapted for swinging movement toward the drum 23 a distance such that the projections will move a rung 31 a distance equal to the spacing of the rungs, whereby the faces 25 of the drum will be brought successively to the position of the face 25ª.

The frame is preferably provided with a yieldable friction member 43 in bearing engagement with one end face of the drum for retaining the faces 25 in proper position when advanced by the pawl bars 39, and in order to confine one face 25 within the range of vision of one undergoing a test a vertical shield 44 is disposed transversely of the casing in the plane of the juncture of face 25ª with the adjacent upper face 25.

A pair of manual operating members 45 extend substantially horizontally beneath a table 46, and such operating members each includes an elongated socket member 47 pivotally connected at its closed end to the pivot rod 35 and resting intermediate its ends in a recess 47' in the support 38. The open end of each socket member slidably receives the forward end of an operating handle 48 which has a pin and slot connection with the socket member, as indicated at 49, and a coil spring 50 is disposed within each socket member between the closed end thereof and the adjacent end of the handle.

A paper strip or tape roll supporting drum 52 is pivotally supported on an axis 53 in longitudinal alinement with a tape guide slot 54 in a block 55 forming the top of table 46, and the paper tape T extends from a roll thereof on the drum 52 through the slot 54, as shown. The strip or tape T is intermittently advanced by means of a driven roller 56 and a cooperating idler roller 57 having respective journalling axles 58 and 59. Axle 58 may be journalled in bearings pressed downward by springs 58ª to yieldably force the rollers against the paper tape. The driven roller 56 is provided with a one-way drive clutch 60 including a ratchet 60' and a pawl 60'' and a reverse-rotation restraining clutch 61 including a ratchet 61' and a pawl 61''.

The clutch 60 is provided with an arm 62 having a link connection 63 with one of the pawl bars 39 whereby, upon rearward movement of bars 39 for advancing the target holding faces 25 on drum 23, the roller 56 will be rotated clockwise and thereby advance the tape T between the rollers 56 and 57 and through the slot 54.

A pair of punches 64 are disposed in block 55 in laterally spaced relation and are normally depressed below slot 54 by means of coil springs 65 which urge the lower ends of the punches substantially below the lower face of block 55.

The slot 54 is provided by the upper face of block 55 and a plate 66 provided with punch-receiving apertures 67.

The operating handles 48 are provided with cams 68 which normally lie below and forward of the lower projecting ends of the punches, as indicated in Figure 1. Upon grasping either handle 48 and raising same to horizontal position and pushing inwardly thereon, the spring 50 is compressed and cam 68 forces the respective punch 64 upwardly through the tape T within slot 54. Upon further forward movement of the handle socket member 47 will be advanced with a corresponding movement of upright bars 33, pawl bars 39, link 63, and arm 62, whereby a drum face 25 will be advanced and the tape T advanced a predetermined distance.

It is to be noted that due to the pivotal connections between socket members 47 and the bars 33, the handles 48 will be returned with the cams 68 out of range of the lower projecting ends of the punches, whereby they will not be operated and the springs 65 will instantly return the punches to inoperative position after forward operative movement of either cam 68.

As will be noted from Figure 4, the panel 21 is provided with slots 70 through which the operating handles 48 extend and the notations "Yes" and "No" appear above the respective handles on the panel 21.

Each of the drum faces 25 is adapted to have removably attached thereto in any desired manner, a target card 71, 71ª, 71ᵇ, etc., as indicated in Figures 5, 5A, and 5B. Each of these cards is printed for one of the several standardized tests as well as having instructions with regard to the punching operation. Thus card 71 is for right eye vision test, card 71ª for left eye vision test, and card 71ᵇ for eye level test.

The tape T is lined to divide same into relatively narrow sections 72, one such section being adapted to be advanced by rollers 56 and 57 in each operation of the apparatus. The sections are printed with "Yes" at one side of the tape and with "No" at the opposite side of the tape, and the sections are further printed for proper designation of the corresponding target cards, as, e. g., "Vision right eye" for card 71, "Vision left eye" for card 71ª, and "Eyes level" for card 71ᵇ.

From the above it will be seen that an improved method for self eye testing is provided, and that the tests are recorded on a strip whereby one undergoing such test is not only apprised of the results thereof but is further provided with a permanent record of such test.

In operation of the improved apparatus in carrying the method into effect, each drum face is provided with a target card similar to those shown in Figures 5, 5A and 5B, and each such card bears letters or markings for a particular test with respect to either or both eyes.

The target cards are properly illuminated by the lamp 28 and the view of one card at a time is assured by means of shield 44. The plate 27 is substantially long and projects into the casing in a plane intersecting faces 25 midway of their opposite ends, whereby each end portion of a target card is viewable by one eye only.

The one undergoing a test looks through the stereoscope 26 at a target, such as designated at 71 and which is disposed on drum face 25ª. Should the letters thereon all be clear, the handle 48 below the designation "Yes" is grasped, moved upwardly and then urged inwardly, whereby upon initial inward movement the left punch 64 will be forced upwardly by cam 68, with the result that a section 72 on tape T will be punched at the "Yes" designation side thereof, as indicated in Figure 6.

The handle 48 will be further urged inwardly for advancing the next succeeding target card into viewing position and simultaneously therewith advancing the tape T to bring a succeeding section 72 in range of the punches 64. This card may be for left eye test, as indicated in Figure 5A, and if all letters are not clear, the handle 48 beneath the "No" designation is grasped by the operator, with the result that the next tape section 72 is punched at its "No" side, and the same operations are carried out for all eight cards on the drum 23.

At the conclusion of the test the recorded length of tape T is torn off, and such provides a permanent record of the test.

While we have disclosed our invention in accordance with a single specific embodiment thereof, such is to be considered as illustrative only, and not restrictive, the scope of the invention being defined in the following claims.

What we claim and desire to secure by U. S. Letters Patent is:

1. Eye testing apparatus comprising a casing, a drum rotatably supported in the casing, said drum supporting a plurality of eye-testing targets to be successively brought into the field of view of an observer, a second drum rotatably supported in the casing, said second drum supporting a record tape having a plurality of sections corresponding in number to the test targets and each section having indicia thereon identifying its associated test target, a table disposed in the casing and provided with a block in the top thereof and having a tape-receiving slot, tape-advancing rollers adapted to advance the tape from said second mentioned drum rotatably supported in the casing adjacent the block, a pair of spaced punches supported by the block for movement through said slot and adapted to punch-mark the tape in the section corresponding to the test target viewed, a pair of upright bars having their lower ends pivotally supported in the casing, a pair of hand operable members having their forward ends pivotally connected to the bars and their rear ends projecting beyond the casing, cam means on the handle members for operating the respective punches, the particular punch operated depending upon the state of vision of the eyes under test, and link and bar connections between said upright bars and said first drum and tape-advancing rollers operative for simultaneously rotating the drum and the rollers upon actuation of either of said handle members, whereby the actuation of a particular one of the punches gives an indication of the condition of the eyes under test.

2. Eye testing apparatus according to claim 1, wherein a ratchet member is rigidly supported on one end of the target card supporting drum co-axially thereof, and wherein said link and bar connections comprise a pair of pawl bars pivotally connected with said upright bars and co-operating with said ratchet member for rotating said drum upon movement of said upright bars through actuation of either of said handle members.

3. Eye testing apparatus according to claim 1, wherein said tape advancing rollers comprise a lower idler roller and an upper driven roller, one-way clutch means for rotating said upper roller in one direction, reverse restraining clutch means associated with the upper roller, and an arm connected with said first clutch means and operatively connected with said link connection.

4. Eye testing apparatus according to claim 1, wherein said handle members each comprises a socket member pivotally connected with said upright bars, a handle having one end thereof slidably supported in said socket member, a pin and slot connection between said handle and said socket member, and a spring disposed in said socket member and bearing against the end of said handle.

5. Eye testing apparatus comprising a casing, a drum rotatably supported in the casing, said drum supporting a plurality of eye-testing targets to be brought into the field of view of an observer, a second drum rotatably supported in the casing, said second drum supporting a record tape having a plurality of sections corresponding in number to the test targets and each section having indicia thereon identifying its associated test target, a table disposed in the casing and having a longitudinally disposed tape-receiving slot therein, upper and lower tape-advancing feed rollers rotatably supported in the casing adjacent said table, a pair of upright bars having their lower ends pivotally supported in the casing, an upright support in the casing adjacent said bars and having a pair of recesses in the upper edge thereof, a pair of elongated manual operating members extending beneath the table, said members having corresponding ends thereof pivotally connected to said upright bars and said members normally resting in said recesses and operative connections between the upper ends of said bars and said target-supporting drum and the upper feed roller for simultaneously rotating same through a predetermined angle upon movement of either one of said elongated operating members inwardly of the casing, a pair of punches supported in the table, and cam means on the operating members for actuating the punches, the particular punch operated depending upon the state of vision of the eyes under test, and the punches adapted to mark the tape in the section corresponding to the test target being viewed.

6. The structure according to claim 5, wherein a yieldable friction brake is disposed between the casing and one end of the target-supporting drum and wherein said operative connections comprise a ratchet member supported by the other end of said target-supporting drum, a pair of pawl bars pivotally supported by said upright bars and engageable with said ratchet member, a pawl and ratchet clutch operatively associated with the upper feed roller, an arm carried by said clutch, and a link connecting said arm with one of said pawl bars.

7. The structure according to claim 5, wherein said punches are slidably disposed in apertures in said table intersecting said slot above said elongated operating members, yieldable means normally maintaining said punches out of registry with said slot and with portions thereof depending below said table, and a cam projection on each operating member engageable with one of said depending portions upon lifting of said member out of said recess and moving same inwardly of the casing.

8. The structure according to claim 5, wherein each of said elongated operating members comprises a socket member having a closed end pivotally connected to one of said upright bars intermediate the ends thereof, an elongated handle having one end thereof slidably disposed within said socket member, a pin and slot connection between said socket member and said end of said handle, and a spring disposed within said socket member and bearing against the closed end thereof and the end of said handle.

IRVING BENNETT.
JACOB VENGER.
GEORGE C. WADDELL.

REFERENCES CITED

The following references are of record in the file of this patent:

UNITED STATES PATENTS

| Number | Name | Date |
|---|---|---|
| 530,752 | Dobbins | Dec. 11, 1894 |
| 609,576 | Ducas | Aug. 23, 1898 |
| 1,087,252 | Muzzy | Feb. 17, 1914 |
| 1,929,872 | Lavery et al. | Oct. 10, 1933 |
| 2,009,158 | Berens | July 23, 1935 |
| 2,157,058 | Ray | May 2, 1939 |
| 2,364,793 | Jobe et al. | Dec. 12, 1944 |